United States Patent
Kanetani et al.

(10) Patent No.: US 11,326,643 B2
(45) Date of Patent: May 10, 2022

(54) ROLLING SLIDING MEMBER AND METHOD OF PRODUCING THE SAME, AND ROLLING BEARING INCLUDING ROLLING SLIDING MEMBER

(71) Applicants: JTEKT CORPORATION, Osaka (JP); NIPPON STEEL & SUMITOMO METAL CORPORATION, Tokyo (JP)

(72) Inventors: Kohei Kanetani, Kashiba (JP); Takashi Sada, Kashiwara (JP); Tomohiro Yamashita, Tokyo (JP); Takahisa Suzuki, Tokyo (JP); Yutaka Neishi, Tokyo (JP); Daisuke Hirakami, Tokyo (JP)

(73) Assignees: JTEKT CORPORATION, Osaka (JP); NIPPON STEEL & SUMITOMO METAL CORPORATION, Tokyo (JP)

( * ) Notice: Subject to any disclaimer, the term of this patent is extended or adjusted under 35 U.S.C. 154(b) by 112 days.

(21) Appl. No.: 16/105,595

(22) Filed: Aug. 20, 2018

(65) Prior Publication Data
US 2019/0063497 A1    Feb. 28, 2019

(30) Foreign Application Priority Data

Aug. 25, 2017    (JP) ............................. JP2017-162065

(51) Int. Cl.
*F16C 19/00* (2006.01)
*F16C 33/12* (2006.01)
*F16C 33/36* (2006.01)

(52) U.S. Cl.
CPC ............ *F16C 33/124* (2013.01); *F16C 19/00* (2013.01); *F16C 33/121* (2013.01);
(Continued)

(58) Field of Classification Search
CPC .. F16C 19/00; F16C 2204/64; F16C 2204/70; F16C 2223/12; F16C 2223/16; F16C 33/124
(Continued)

(56) References Cited

U.S. PATENT DOCUMENTS 6,095,692 A * 8/2000 Takemura ............... C22C 38/50
384/492
10,538,832 B2 * 1/2020 Neishi ..................... C22C 38/22
(Continued)

FOREIGN PATENT DOCUMENTS

CN    106661691 A    5/2017
CN    107013567 A    8/2017
(Continued)

OTHER PUBLICATIONS

NPL: translation of JP-09053169-A, Feb. 1997 (Year: 1997).*
(Continued)

*Primary Examiner* — Jie Yang
(74) *Attorney, Agent, or Firm* — Oliff PLC

(57) ABSTRACT

A rolling sliding member includes a base part and a surface layer. The base part has a composition that includes 0.30 mass % to 0.45 mass % of carbon, 0.15 mass % to 0.45 mass % of silicon, 0.40 to 1.50 mass % of manganese, 0.60 mass % to 2.00 mass % of chromium, 0.10 mass % to 0.35 mass % of molybdenum, 0.20 mass % to 0.40 mass % of vanadium, and 0.005 mass % to 0.100 mass % of aluminum, and a remainder of iron and inevitable impurities. The surface layer is positioned around the base part. The surface layer has a Vickers hardness of 700 to 800 and a retained austenite content of 25 volume % to 50 volume %. The thickness of a grain boundary oxide layer satisfies Formula: thickness of grain boundary oxide layer≤equivalent diameter of rolling sliding member×1.4×10⁻³.

5 Claims, 9 Drawing Sheets

(52) U.S. Cl.
CPC ........ *F16C 33/366* (2013.01); *F16C 2202/04* (2013.01); *F16C 2204/62* (2013.01); *F16C 2204/64* (2013.01); *F16C 2204/70* (2013.01); *F16C 2223/12* (2013.01); *F16C 2223/16* (2013.01); *F16C 2240/60* (2013.01)

(58) Field of Classification Search
USPC ........................................................ 148/316
See application file for complete search history.

(56) References Cited

U.S. PATENT DOCUMENTS

| | | |
|---|---|---|
| 2007/0246126 A1 | 10/2007 | Hattori et al. |
| 2017/0167538 A1 | 6/2017 | Sada et al. |
| 2017/0211170 A1 | 7/2017 | Neishi et al. |

FOREIGN PATENT DOCUMENTS

| | | | |
|---|---|---|---|
| JP | 09053169 A | * | 2/1997 |
| JP | 2007-308792 A | | 11/2007 |
| JP | 2017-106074 A | | 6/2017 |
| WO | 2016/017162 A1 | | 2/2016 |

OTHER PUBLICATIONS

Mar. 12, 2021 Office Action issued in Chinese Patent Application No. 201810965040.8.
Mar. 9, 2021 Office Action issued in Japanese Patent Application No. 2017-162065.

* cited by examiner

ROLLING SLIDING MEMBER AND METHOD OF PRODUCING THE SAME, AND ROLLING BEARING INCLUDING ROLLING SLIDING MEMBER

INCORPORATION BY REFERENCE

The disclosure of Japanese Patent Application No. 2017-162065 filed on Aug. 25, 2017 including the specification, drawings and abstract is incorporated herein by reference in its entirety.

BACKGROUND

1. Technical Field

The present disclosure relates to a rolling sliding member and a method of producing the same, and a rolling bearing including the rolling sliding member.

2. Description of Related Art

For rolling sliding members used in bearings and the like, carburized steels such as chromium molybdenum steel (SCM steel) and nickel chromium molybdenum steel (SNCM steel) are widely used in consideration of ease of quenching.

The rolling sliding member is in contact with a counterpart member on a rolling sliding surface. In consideration of the influence of this contact on the product lifespan, a technique in which, in the rolling sliding member, a carburizing treatment and the like are performed on a molding raw material containing a carburized steel, and a hard layer (hereinafter referred to as a surface layer) is provided on a surface part thereof is known (for example, Japanese Unexamined Patent Application Publication No. 2007-308792 (JP 2007-308792 A)).

SUMMARY

In the above carburized steels such as SCM steel or SNCM steel, a carbon content is relatively low. In order to obtain a surface layer that can contribute to improvement of the product lifespan, it is necessary to perform a carburizing treatment for a long time. When the carburizing treatment is performed for a long time, the production costs may be increasing.

In addition, when a time required for the carburizing treatment is long, crystal grains are coarsened. Thus, it is necessary to perform secondary quenching in order to adjust the size of crystal grains to a desired size. When secondary quenching is performed in addition to the carburizing treatment being performed for a long time, the above production costs further increase.

When a time required for the carburizing treatment is long, formation of a grain boundary oxide layer on a surface of a molding raw material is facilitated. The developed grain boundary oxide layer reduces the strength of the surface layer. Therefore, when the developed grain boundary oxide layer remains on the rolling sliding member, cracks are likely to occur in the grain boundary oxide layer part when a load is applied to the surface, and thus the crack resistance is reduced. Moreover, the grain boundary oxide layer is likely to fall off. When the grain boundary oxide layer falls off, fallen material, as a foreign substance, may be caught in the inside of a product such as a bearing. As a result, the foreign substances may have an adverse effect on the product lifespan.

The present disclosure provides a rolling sliding member and a method of producing the same and a rolling bearing including the rolling sliding member through which it is possible to reduce the production costs and it is possible to contribute to improvement of the product lifespan.

A first aspect of the present disclosure is a rolling sliding member. The rolling sliding member includes a rolling sliding surface that is in contact with a counterpart member in a relative manner. The rolling sliding member includes a base part and a surface layer. The base part has a composition including 0.30 mass % to 0.45 mass % of carbon, 0.15 mass % to 0.45 mass % of silicon, 0.40 mass % to 1.50 mass % of manganese, 0.60 mass % to 2.00 mass % of chromium, 0.10 mass % to 0.35 mass % of molybdenum, 0.20 mass % to 0.40 mass % of vanadium, and 0.005 mass % to 0.100 mass % of aluminum and a remainder of iron and inevitable impurities. The surface layer is positioned around the base part and includes the rolling sliding surface. The surface layer has a Vickers hardness of 700 to 800. The surface layer has a retained austenite content of 25 volume % to 50 volume %. The thickness of a grain boundary oxide layer in the surface layer satisfies the following formula (I) expressed using an equivalent diameter of the rolling sliding member.

Thickness of grain boundary oxide layer≤equivalent diameter of rolling sliding member×1.4×10$^{-3}$.  Formula (I):

The base part has the same composition as a molding raw material having the composition as mentioned above. According to this configuration, the rolling sliding member is formed of a molding raw material having a carbon content of 0.30 mass % or more. The rolling sliding member is formed of a steel material having a relatively high carbon content for a base compared to SCM steel and SNCM steel which are widely used for rolling sliding members in the related art. Thus, in the rolling sliding member, even if a time required for a carburizing treatment and the like is shortened, a hard and tough surface layer is obtained. In the rolling sliding member, since a treatment time can be shortened, it is possible to reduce the production costs. In the rolling sliding member, the surface layer has the above Vickers hardness and retained austenite content. The surface layer is hard and also tough. According to the rolling sliding member, the rolling fatigue lifespan is prolonged. In addition, since the grain boundary oxide layer is formed only to the extent that its thickness satisfies Formula (I), the rolling sliding member has favorable crack resistance. According to the rolling sliding member, since the grain boundary oxide layer is unlikely to fall off, formation of foreign substances that could be caught between the rolling sliding member and a counterpart member is suppressed. Thus, the rolling sliding member can contribute to improvement of the product lifespan.

In the rolling sliding member, the surface layer may be either a carburized layer or a carbonitrided layer. In this case, in the rolling sliding member, a surface layer which is sufficiently hard and tough is obtained.

A second aspect of the present disclosure is a rolling bearing. The rolling bearing includes an outer ring, an inner ring, and a plurality of rolling elements. The outer ring includes a rolling sliding surface on an inner circumference of the outer ring. The inner ring includes a rolling sliding surface on an outer circumference of the inner ring. The plurality of rolling elements is disposed between the first rolling sliding surface and the second rolling sliding surface. At least one of the outer ring, the inner ring, and a rolling element is the rolling sliding member according to the first aspect.

In the rolling bearing of the present disclosure, since at least one of the outer ring, the inner ring and the rolling element is formed of the above rolling sliding member, it is possible to reduce the production costs. In addition, according to the rolling bearing, since it is possible to effectively prevent a foreign substance from entering between counterpart members, it is possible to improve the product lifespan.

A third aspect of the present disclosure is a method of producing a rolling sliding member including a rolling sliding surface that is in contact with a counterpart member in a relative manner. The production method includes: obtaining a molding raw material from a steel material having a composition which includes 0.30 mass % to 0.45 mass % of carbon, 0.15 mass % to 0.45 mass % of silicon, 0.40 mass % to 1.50 mass % of manganese, 0.60 mass % to 2.00 mass % of chromium, 0.10 mass % to 0.35 mass % of molybdenum, 0.20 mass % to 0.40 mass % of vanadium, and 0.005 mass % to 0.100 mass % of aluminum, and a remainder of iron and inevitable impurities; obtaining an intermediate material by heating the molding raw material while a temperature of 900° C. to 980° C. is maintained under an atmosphere in which a carbon potential is set in a range of 0.9 to 1.4; quenching the intermediate material by cooling the intermediate material from a temperature of 820° C. to 900° C.; and tempering the quenched intermediate material.

In the method of producing a rolling sliding member of the present disclosure, heating is performed under an atmosphere in which a carbon potential is adjusted for a molding raw material containing a steel material having a relatively high carbon content for a base, and quenching and tempering are performed on an intermediate material obtained by the heating. Therefore, in the production method of the present disclosure, a desired surface layer is obtained within a shorter treatment time than in a production method of the related art. In other words, it is possible to shorten a time required for formation of the surface layer. In the production method, it is possible to reduce the production costs. In addition, since shortening of a treatment time suppresses formation of the grain boundary oxide layer, it is possible to obtain a rolling sliding member having excellent crack resistance according to the production method. According to the rolling sliding member obtained in the production method, since the grain boundary oxide layer is unlikely to fall off, formation of foreign substances that could be caught between the rolling sliding member and a counterpart member is suppressed. The rolling sliding member can also contribute to improvement of the product lifespan.

As can be clearly understood from the above description, the rolling sliding member and the method of producing the same of the present disclosure have effects of reducing the production costs and contributing to improvement of the product lifespan. That is, according to the present disclosure, it is possible to obtain a rolling sliding member and a method of producing the same and a rolling bearing including the rolling sliding member through which it is possible to reduce the production costs and it is possible to contribute to improvement of the product lifespan.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
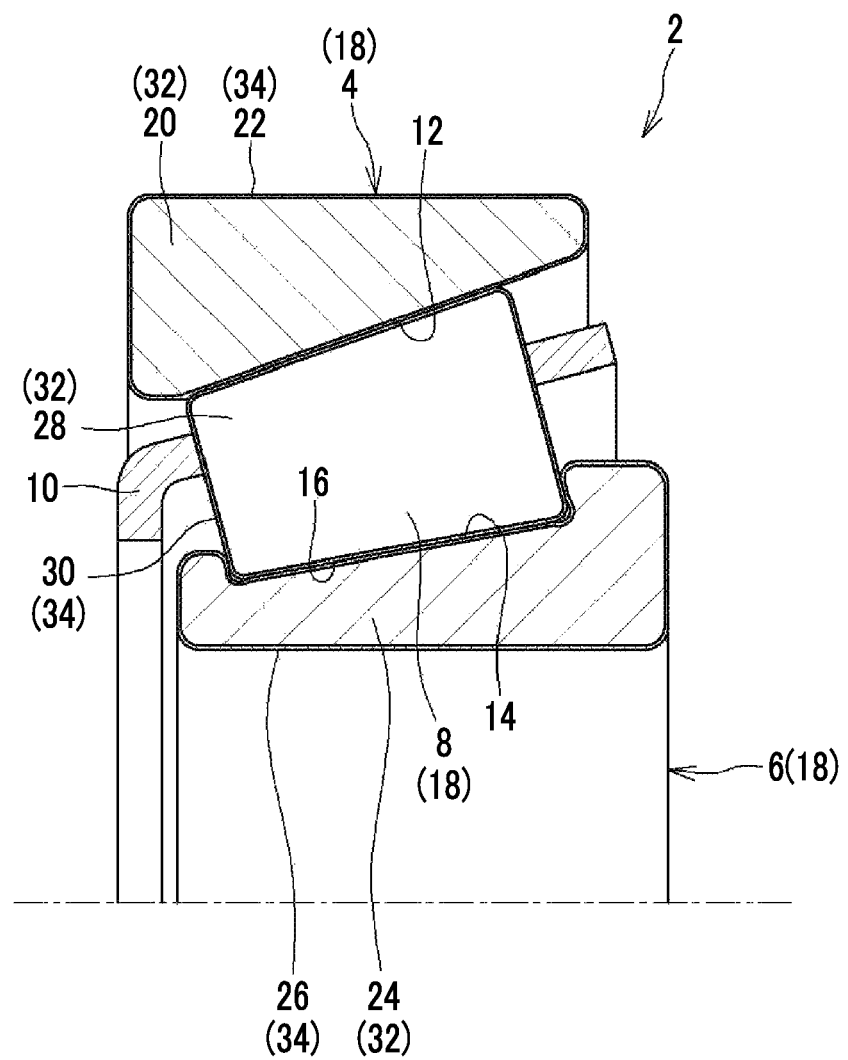
FIG. 1 is a sectional view of a main part of a tapered roller bearing which is an example of a rolling bearing according to an embodiment of the present disclosure.

The present disclosure will be described below in detail based on preferable embodiments with reference to the drawing appropriately.

Rolling Bearing

As a rolling bearing according to an embodiment of the present disclosure, a tapered roller bearing will be exemplified below. The rolling bearing of the present disclosure is not limited to a tapered roller bearing. For example, the rolling bearing may be a cylindrical roller bearing or a ball bearing.

FIG. 1 shows a part of a rolling bearing 2 (tapered roller bearing) according to an embodiment of the present disclosure. The rolling bearing 2 includes an outer ring 4, an inner ring 6, a plurality of rolling elements 8, and a cage 10.

The outer ring 4 includes a rolling sliding surface 12 on its inner circumferential side. The rolling sliding surface 12 extends in a circumferential direction on the inner circumferential side of the outer ring 4. In the rolling bearing 2, the plurality of rolling elements 8 rolls on the rolling sliding surface 12 of the outer ring 4. The rolling sliding surface 12 is a raceway surface. The outer ring 4 is in contact with a rolling element 8 which is a counterpart member on the rolling sliding surface 12 in a relative manner. The outer ring 4 includes the rolling sliding surface 12 that is in contact with the rolling element 8 in a relative manner. Contact with the rolling element 8 includes either or both of rolling contact and sliding contact.

The inner ring 6 is disposed concentrically with the outer ring 4. The inner ring 6 includes a rolling sliding surface 14 on its outer circumferential side. The rolling sliding surface 14 is disposed to face the rolling sliding surface 12 of the outer ring 4. The rolling sliding surface 14 extends in a circumferential direction on the outer circumferential side of the inner ring 6. In the rolling bearing 2, the plurality of rolling elements 8 rolls on the rolling sliding surface 14 of the inner ring 6. The rolling sliding surface 14 is a raceway surface. The inner ring 6 is in contact with the rolling element 8 which is a counterpart member on the rolling sliding surface 14 in a relative manner. The inner ring 6 includes the rolling sliding surface 14 that is in contact with the rolling element 8 in a relative manner. Contact with the rolling element 8 includes either or both of rolling contact and sliding contact.

The plurality of rolling elements 8 is positioned between the outer ring 4 and the inner ring 6. The rolling elements 8 roll on the rolling sliding surface 12 of the outer ring 4 and roll on the rolling sliding surface 14 of the inner ring 6. Thereby, in the rolling bearing 2, the outer ring 4 and the inner ring 6 are relatively rotatable. In the rolling bearing 2, the rolling element 8 is a tapered roller. The rolling bearing 2 is a tapered roller bearing. In the rolling element, a side surface of the tapered roller is a rolling sliding surface 16. The rolling element 8 is in contact with the outer ring 4 and the inner ring 6 which are counterpart members on the rolling sliding surface 16 in a relative manner. The rolling element 8 includes the rolling sliding surface 16 that is in contact with the outer ring 4 and the inner ring 6 in a relative manner. Contact with each of the outer ring 4 and the inner ring 6 includes either or both of rolling contact and sliding contact.

The cage 10 is an annular member. The cage 10 is disposed concentrically with the outer ring 4 and the inner ring 6. The cage 10 is formed of a metal, a synthetic resin or the like. The cage 10 holds the rolling element 8 between the outer ring 4 and the inner ring 6.

In the rolling bearing 2 of the present embodiment, at least one of the outer ring 4, the inner ring 6, and the rolling element 8 is an example of a rolling sliding member 18 to be described below. In the rolling bearing 2 shown in FIG. 1, all of the outer ring 4, the inner ring 6, and the rolling element 8 are examples of the rolling sliding member 18.

Rolling Sliding Member 18

As described above, in the rolling bearing 2, all of the outer ring 4, the inner ring 6, and the rolling element 8 are the rolling sliding members 18. The rolling sliding member 18 according to an embodiment of the present disclosure will be described below based on the outer ring 4, the inner ring 6, and the rolling element 8.

The outer ring 4 includes a base part 20 and a surface layer 22. The surface layer 22 is positioned around the base part 20 and is laminated on the base part 20. The surface layer 22 covers the base part 20. The above rolling sliding surface 12 is included in the surface layer 22.

The inner ring 6 includes a base part 24 and a surface layer 26. The surface layer 26 is positioned around the base part 24 and is laminated on the base part 24. The surface layer 26 covers the base part 24. The above rolling sliding surface 14 is included in the surface layer 26.

The rolling element 8 includes a base part 28 and a surface layer 30. The surface layer 30 is positioned around the base part 28 and is laminated on the base part 28. The surface layer 30 covers the base part 28. The above rolling sliding surface 16 is included in the surface layer 30.

In the present disclosure, the rolling sliding member 18 forming each of the outer ring 4, the inner ring 6 and the rolling element 8 is formed of a molding raw material containing a steel material having a composition including 0.30 mass % to 0.45 mass % of carbon, 0.15 mass % to 0.45 mass % of silicon, 0.40 mass % to 1.50 mass % of manganese, 0.60 mass % to 2.00 mass % of chromium, 0.10 mass % to 0.35 mass % of molybdenum, 0.20 mass % to 0.40 mass % of vanadium, and 0.005 mass % to 0.100 mass % of aluminum and a remainder of iron and inevitable impurities for a base. In this composition, the inevitable impurities constituting the remainder are substances mixed in from raw materials when a steel material is produced, and are substances that are acceptable within a range in which the object of the present disclosure is not inhibited. Examples of such inevitable impurities include phosphorus, sulfur, and copper.

Carbon is an element for securing quenching properties of a steel material when the rolling sliding member 18 is produced and for obtaining the internal hardness in order to secure the strength, and is an element that can shorten a carburization time during a heat treatment when it is added in a sufficient amount. However, when an excess amount of carbon is added, the hardness of the steel material becomes too high, which causes deterioration in hot processability and reduction in a tool lifespan during cutting. In the rolling sliding member 18 in the present embodiment, a content of carbon contained in the steel material is 0.30 mass % or more, and preferably 0.35 mass % or more in order to obtain a sufficient internal hardness and a carburization time shortening effect. A content of carbon is 0.45 mass % or less, and preferably 0.44 mass % or less in order to obtain sufficient processability before a heat treatment.

Silicon is an element necessary for deoxidation during steel material refining. In addition, silicon is an element that reduces precipitation of a film-like carbide at crystal grain boundaries and contributes to improvement of the grain boundary strength. However, when an excess amount of silicon is added, since the hardness increases due to reinforcement of ferrite, the processability of the steel material deteriorates. In the rolling sliding member 18 in the present embodiment, a content of silicon contained in the steel material is 0.15 mass % or more, preferably 0.20 mass % or more, and more preferably 0.25 mass % or more in order to reduce precipitation of a film-like carbide at crystal grain boundaries. A content of silicon is 0.45 mass % or less, preferably 0.40 mass % or less, and more preferably 0.35 mass % or less in order to secure sufficient processability before a heat treatment.

Manganese is an element for securing quenching properties of a steel material when the rolling sliding member 18 is produced and for obtaining the internal hardness in order to secure the strength of the steel material. In addition, since manganese is an element that stabilizes austenite, an austenite content can be easily increased by increasing an amount of manganese. However, when an excess amount of manganese is added, the hardness of the steel material becomes too high, which causes deterioration in hot processability and reduction in a tool lifespan during cutting. In the rolling sliding member 18 in the present embodiment, a content of manganese contained in the steel material is 0.40 mass % or more, preferably 0.45 mass % or more, and more preferably 0.50 mass % or more in order to obtain sufficient quenching properties and retained austenite content. A content of manganese is 1.50 mass % or less, preferably 1.30 mass % or less, more preferably 1.00 mass % or less, and most preferably 0.75 mass % or less in order to obtain sufficient processability before a heat treatment.

Chromium is an element for improving quenching properties of a steel material when the rolling sliding member 18 is produced and for increasing the hardness. Since chromium is an element that further stabilizes austenite, an amount of austenite can be easily increased by increasing an amount of chromium. However, when an excess amount of chromium is added, since an amount of carbide in a nonsolid solution state before a heat treatment increases, this acts as a precipitation nucleus, coarse carbides precipitate after a heat treatment, and serve as a starting point of fatigue failure, and a reduction in the rolling fatigue lifespan is caused. In the rolling sliding member 18 in the present embodiment, a content of chromium contained in the steel material is 0.60 mass % or more, preferably 0.90 mass % or more, and more preferably 1.10 mass % or more in order to obtain sufficient hardness and retained austenite content. A content of chromium is 2.00 mass % or less, preferably 1.70 mass % or less, and more preferably 1.30 mass % or less in order to reduce generation of coarse precipitates which serve as a starting point of fatigue failure and prevent the rolling fatigue lifespan from being reduced.

Molybdenum is an element that improves quenching properties of a steel material similarly to chromium and can easily increase an amount of austenite. In addition, molybdenum is an element that reduces concentration of carbon at crystal grain boundaries and improves the grain boundary strength. However, molybdenum has a very strong affinity with carbon, and when an excess amount of molybdenum is added, coarsening of precipitates is caused. In the rolling sliding member 18 in the present embodiment, a content of molybdenum contained in the steel material is 0.10 mass % or more, preferably 0.15 mass % or more, and more preferably 0.20 mass % or more in order to obtain sufficient hardness and retained austenite content and in order to prevent concentration of carbon at crystal grain boundaries and improve the grain boundary strength. A content of molybdenum is 0.35 mass % or less, preferably 0.30 mass % or less, and more preferably 0.28 mass % or less in order to reduce generation of coarse precipitates which serve as a starting point of fatigue failure and prevent the rolling fatigue lifespan from being reduced.

Since vanadium is an element that easily bonds with carbon, vanadium causes a very hard carbide to be precipitated, and increases the hardness of a steel material after quenching according to precipitation reinforcement. However, when a large amount of vanadium is added, since excess carbide precipitates and a solid solution amount of carbon in the steel material decreases, a retained austenite content decreases. In the rolling sliding member 18 in the present embodiment, a content of vanadium contained in the steel material is 0.20 mass % or more, preferably 0.22 mass % or more, and more preferably 0.25 mass % or more in order to obtain sufficient hardness according to precipitation reinforcement. A content of vanadium is 0.40 mass % or less, preferably 0.38 mass % or less, and more preferably 0.35 mass % or less in order to prevent an amount of solid solution amount of carbon from being reduced and to secure a sufficient retained austenite content.

Aluminum is an element that deoxidizes steel. However, when a large amount of aluminum is added, coarse oxide inclusions remain in steel, and the rolling fatigue lifespan is reduced. In the rolling sliding member 18 in the present embodiment, a content of aluminum contained in the steel material is 0.005 mass % or more, preferably 0.008 mass % or more, and more preferably 0.010 mass % or more in order to obtain a sufficient deoxidation effect. A content of aluminum is 0.100 mass % or less, preferably 0.050 mass % or less, and more preferably 0.048 mass % or less in order to reduce an amount of oxide inclusions remaining.

Phosphorus is an inevitable impurity. Thus, a content of phosphorus contained in the steel material is preferably as low as possible. In consideration of the present embodiment, a content of phosphorus is preferably 0.030 mass % or less, and more preferably 0.025 mass % or less.

Sulfur is an inevitable impurity. Thus, a content of sulfur contained in the steel material is preferably as low as possible. In consideration of this fact, a content of sulfur is preferably 0.030 mass % or less, and more preferably 0.025 mass % or less.

In the present embodiment, a base part 32 of the rolling sliding member 18, that is, each of the base part 20 of the outer ring 4, the base part 24 of the inner ring 6, and the base part 28 of the rolling element 8, has the same composition as the composition of a molding raw material. In the rolling sliding member 18, the hardness of the base part 32 and a retained austenite content are appropriately controlled. The base part 32 contributes to securing the strength and the toughness in the rolling sliding member 18.

In the present embodiment, a surface layer 34 of the rolling sliding member 18, that is, each of the surface layer 22 of the outer ring 4, the surface layer 26 of the inner ring 6, and the surface layer 30 of the rolling element 8, is obtained by performing a heat treatment such as a carburizing treatment and a carbonitriding treatment on the above molding raw material. In the rolling sliding member 18, the surface layer 34 is a carburized-surface hardened component or a carbonitrided-surface hardened component of a molding raw material obtained by performing a heat treatment including a carburizing treatment or a carbonitriding treatment. The surface layer 34 includes a carburized layer or a carbonitrided layer.

In the rolling sliding member 18, the Vickers hardness (also referred to as "surface Vickers hardness") of the surface layer 34 is 700 to 800. The surface layer 34 is hard and also has sufficient toughness. The surface layer 34 contributes to prolonging the rolling fatigue lifespan. Particularly, the Vickers hardness of the surface layer 34 is 700 or more, and preferably 720 or more in order to secure sufficient hardness for use as a member of the rolling bearing 2. The Vickers hardness of the surface layer 34 is 800 or less, and preferably 780 or less in order to reduce a decrease in the rolling fatigue lifespan due to a reduction in the retained austenite content. In the rolling bearing 2 in the present embodiment, in each of the outer ring 4, the inner ring 6, and the rolling element 8, since the surface layer 34 has a surface Vickers hardness in the above range, sufficient strength is secured for the rolling bearing 2. In the present embodiment, the Vickers hardness is measured by placing a Vickers indenter at a position at a depth of 50 μm from a surface on a cut surface obtained by cutting the rolling sliding member 18 in a depth direction from its surface (that is, the rolling sliding surface 12 of the outer ring 4, the rolling sliding surface 14 of the inner ring 6, or the rolling sliding surface 16 of the rolling element 8).

In the rolling sliding member 18, a retained austenite content in the surface layer 34 (specifically, a retained austenite content in a depth range of 10 μm from the surface of the rolling sliding member 18) is 25 volume % to 50 volume %. The surface layer 34 is tough and also has sufficient hardness. The surface layer 34 contributes to securing prolonging of the rolling fatigue lifespan. Particularly, a retained austenite content in the surface layer 34 is 25 volume % or more, preferably 35 volume % or more, and more preferably 37 volume % or more in order to secure a sufficient rolling fatigue lifespan. A retained austenite content in the surface layer 34 is 50 volume % or less, and preferably 45 volume % or less in order to secure sufficient hardness for use as the rolling sliding member 18. In the rolling bearing 2 in the present embodiment, in each of the outer ring 4, the inner ring 6, and the rolling element 8, since the surface layer 34 has a retained austenite content in the above range, a sufficiently prolonged rolling fatigue lifespan is secured for the rolling bearing 2. In the present embodiment, a retained austenite content is obtained by calculating a ratio between integrated intensities of α phase (martensite) and γ phase (austenite) from the surface of the rolling sliding member 18 to a position at a depth of 10 μm according to X-ray diffraction.

In the rolling sliding member 18 in the present embodiment, the surface layer 34 is preferably a carburized layer or a carbonitrided layer in order to obtain the surface layer 34 which is sufficiently hard and tough.

In the above carburizing treatment or carbonitriding treatment, there is a concern of formation of a grain boundary oxide layer being facilitated. However, in the rolling sliding member 18 of the present disclosure, formation of the grain boundary oxide layer is effectively suppressed. Specifically, the thickness of the grain boundary oxide layer in the surface layer 34 satisfies the following Formula (I) expressed using an equivalent diameter of the rolling sliding member 18.

$$\text{Thickness of grain boundary oxide layer} \leq \text{equivalent diameter of rolling sliding member } 18 \times 1.4 \times 10^{-3} \quad (I)$$

Here, the equivalent diameter of the outer ring 4 and the inner ring 6 as the rolling sliding member 18 is represented by the product of a shape coefficient of a ring determined by an inner diameter X, a wall thickness Y and a width Z of the ring and the wall thickness Y of the ring. In the present embodiment, "British Standards Institute: Method for the Estimation of Equivalent Diameters in the Heat Treatment of Steel" was referred to for shape coefficients of the ring shown in the following Table 1.

TABLE 1

| Z/Y | X/Y | | | | |
|---|---|---|---|---|---|
|  | 0 | 0.5 | 1 | 2 | ∞ |
| 1 | 1.27 | 1.11 | 1.08 | 1.08 | 1.08 |
| 1.5 | 1.58 | 1.33 | 1.28 | 1.27 | 1.27 |
| 2 | 1.78 | 1.46 | 1.40 | 1.40 | 1.40 |
| 3 | 1.98 | 1.56 | 1.50 | 1.48 | 1.48 |
| 4 | 2.00 | 1.58 | 1.52 | 1.51 | 1.50 |
| 10 | 2.00 | 1.58 | 1.52 | 1.51 | 1.50 |
| ∞ | 2.00 | 1.58 | 1.55 | 1.53 | 1.50 |

Figure 2:
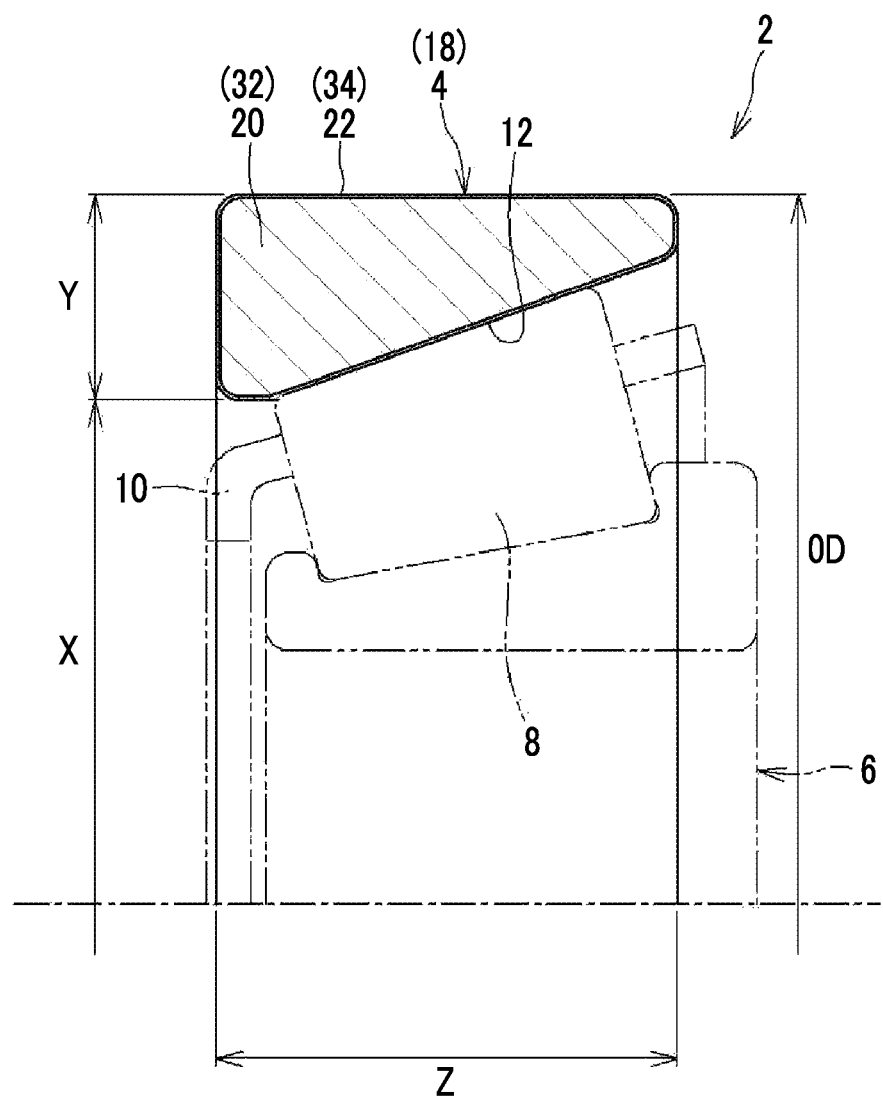
FIG. 2 is a sectional view showing sizes of parts used for obtaining an equivalent diameter of an outer ring.
Figure 3:
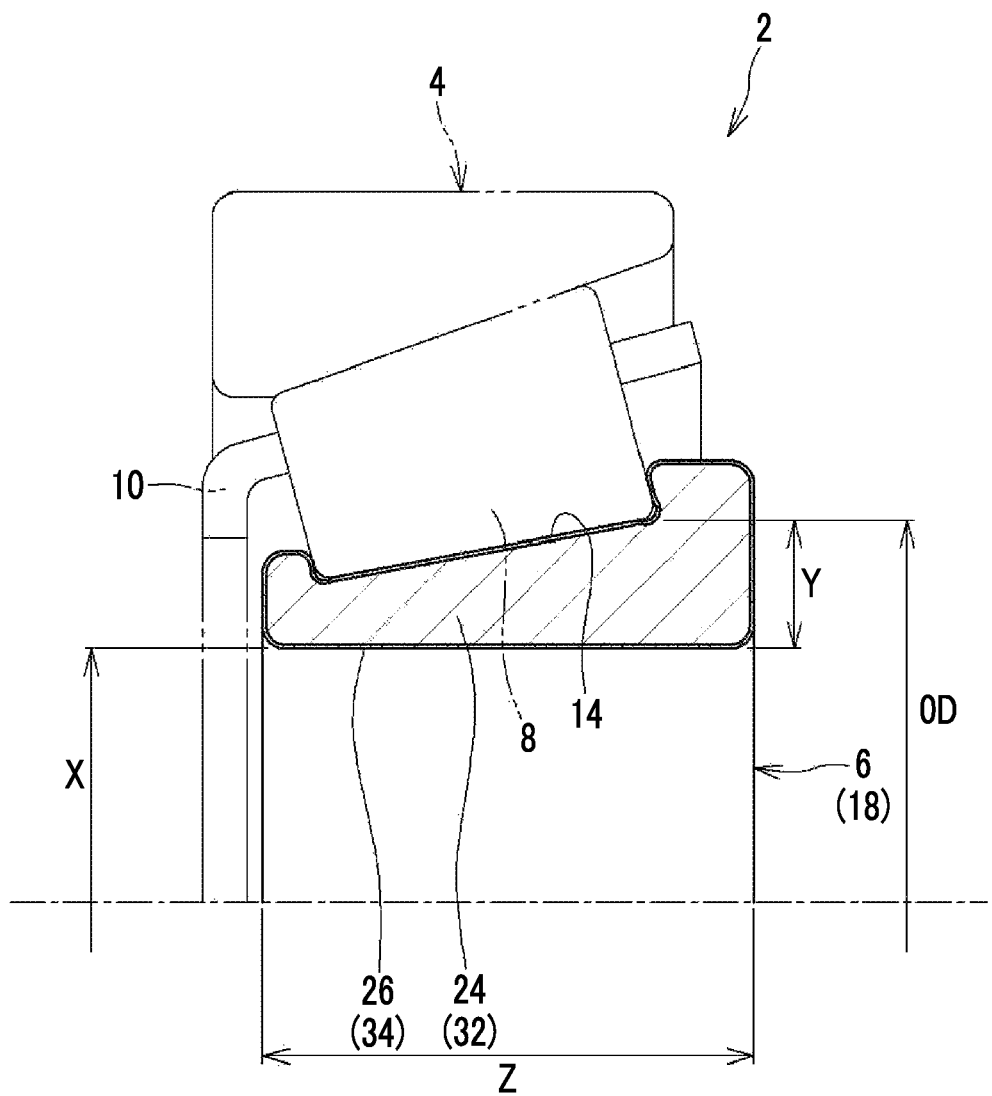
FIG. 3 is a sectional view showing sizes of parts used for obtaining an equivalent diameter of an inner ring.

Regarding the inner diameter X, the wall thickness Y, and the width Z of the ring, sizes shown in FIG. 2 are used for the outer ring 4. Particularly, for the inner diameter X of the outer ring 4, an inner diameter at a position on a raceway surface at which the trajectory is the smallest is used. In the case of the inner ring 6, sizes shown in FIG. 3 are used. Particularly, for an outer diameter OD of the inner ring 6, an outer diameter at a position on the raceway surface at which the trajectory is the largest is used.

Figure 4:
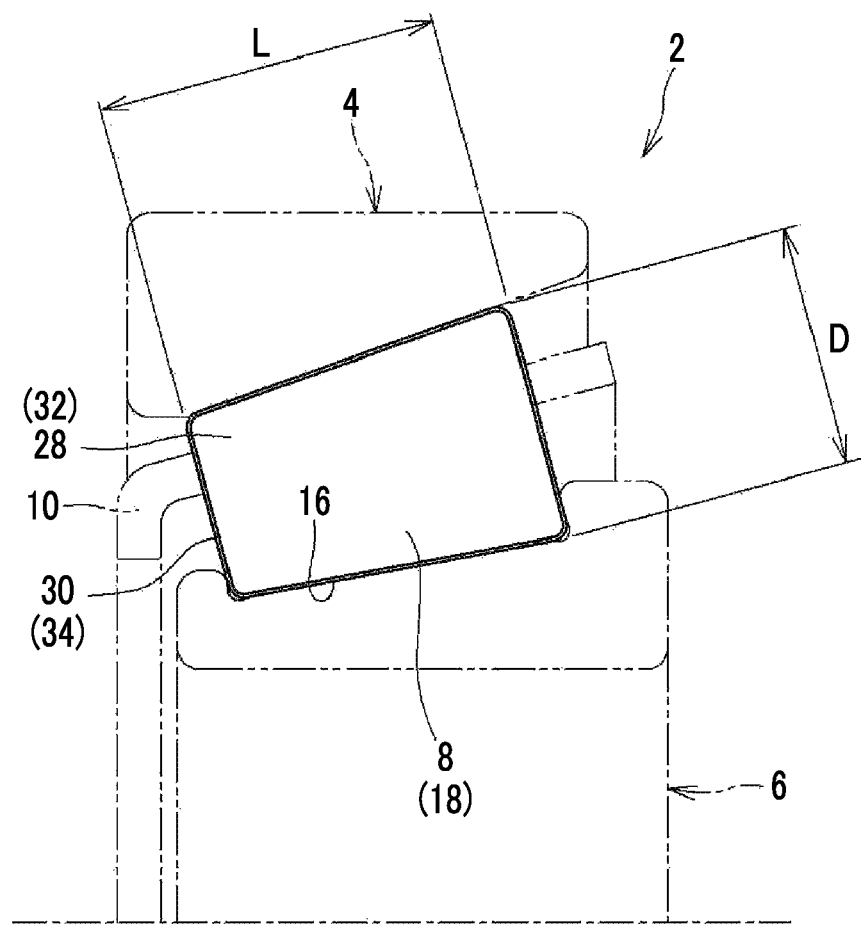
FIG. 4 is a sectional view showing sizes of parts used for obtaining an equivalent diameter of a tapered roller.

For the equivalent diameter of the rolling element 8 as the rolling sliding member 18, an equivalent diameter determined by a diameter and a length of a cylinder shown in "Equivalent Diameters for Cylinders and discs, oil quenched" described in "British Standards 5046: 1974" is used. In a tapered roller as the rolling element 8, a length L of the tapered roller shown in FIG. 4 corresponds to the length of the cylinder and a large end diameter D of the tapered roller corresponds to the diameter of the cylinder.

The rolling sliding member 18 of the present embodiment is formed of a molding raw material having a carbon content of 0.30 mass % or more. The rolling sliding member 18 is formed of a steel material having a relatively high carbon content for a base compared to SCM steel and SNCM steel which are widely used for rolling sliding members in the related art. Thus, in the rolling sliding member 18, even if a time required for a carburizing treatment or a carbonitriding treatment is shortened, the hard and tough surface layer 34 is obtained. In the rolling sliding member 18, since a treatment time can be shortened, it is possible to reduce the production costs. In the rolling sliding member 18, the surface layer 34 has the above Vickers hardness and retained austenite content. The surface layer 34 is hard and also tough. According to the rolling sliding member 18, the rolling fatigue lifespan is prolonged. In addition, since the grain boundary oxide layer is formed only to the extent that its thickness satisfies Formula (I), the rolling sliding member 18 has favorable crack resistance. According to the rolling sliding member 18, since the grain boundary oxide layer is unlikely to fall off, formation of foreign substances that could be caught between the rolling sliding member and a counterpart member is suppressed. The rolling sliding member 18 can contribute to improvement of the product lifespan.

In the rolling sliding member 18, in order to reduce the production costs and improve the product lifespan, the thickness of the grain boundary oxide layer in the surface layer 34 preferably satisfies the following Formula (II) expressed using an equivalent diameter of the rolling sliding member 18, $$\text{Thickness of grain boundary oxide layer} \leq \text{equivalent diameter of rolling sliding member } 18 \times 1.3 \times 10^{-3} \quad (II)$$

and more preferably satisfies the following Formula (III).

$$\text{Thickness of grain boundary oxide layer} \leq \text{equivalent diameter of rolling sliding member } 18 \times 1.2 \times 10^{-3} \quad (III)$$

In the rolling sliding member 18, a carbon content of the surface layer 34 is preferably 0.70 mass % to 1.10 mass % or less. A carbon content of the surface layer 34 is preferably 0.70 mass % or more, more preferably 0.75 mass % or more, and most preferably 0.80 mass % or more in order to secure a sufficient surface hardness. In order to reduce the remainder such as coarse carbonitrides, a carbon content of the surface layer 34 is preferably 1.10 mass % or less, more preferably 1.05 mass % or less, and most preferably 1.00 mass % or less. Here, in the present embodiment, a carbon content of the surface layer 34 is represented by a carbon content in the surface of the surface layer 34, that is, at a position at a depth of 10 μm from the rolling sliding surface 12.

In the rolling sliding member 18, when the surface layer 34 is a carbonitrided layer, in order to secure a sufficient surface hardness, a nitrogen content in the surface layer 34 is preferably 0.05 mass % or more, and more preferably 0.10 mass % or more. In order to reduce the remainder of coarse carbonitrides, a nitrogen content in the surface layer 34 is preferably 0.80 mass % or less and more preferably 0.70 mass % or less. Here, a nitrogen content in the surface layer 34 is represented by a nitrogen content in the surface of the surface layer 34, that is, at a position at a depth of 10 μm from the rolling sliding surface 12.

In the rolling sliding member 18, the surface layer 34 has the same composition as the base part 32, which includes silicon, manganese, chromium, molybdenum, vanadium and aluminum. In the surface layer 34, a silicon content, a manganese content, a chromium content, a molybdenum content, a vanadium content and an aluminum content are the same as those in the base part 32.

Method of Producing Rolling Sliding Member 18

The rolling sliding member 18 described above is obtained by a production method including, (1) a process of obtaining a molding raw material from a steel material having a composition which includes 0.30 mass % to 0.45 mass % of carbon, 0.15 mass % to 0.45 mass % of silicon, 0.40 mass % to 1.50 mass % of manganese, 0.60 mass % to 2.00 mass % of chromium, 0.10 mass % to 0.35 mass % of molybdenum, 0.20 mass % to 0.40 mass % of vanadium, and 0.005 mass % to 0.100 mass % of aluminum, and a remainder of iron and inevitable impurities,
(2) a process of obtaining an intermediate material by heating the molding raw material while a temperature of 900° C. to 980° C. is maintained under an atmosphere in which a carbon potential is set in a range of 0.9 to 1.4,
(3) a process of quenching the intermediate material by cooling the intermediate material from a temperature of 820° C. to 900° C., and
(4) a process of tempering the quenched intermediate material.

The processes included in the method of producing the rolling sliding member 18 according to the present disclosure will be described below based on the method of producing the inner ring 6 shown in FIG. 5.

Figure 5:
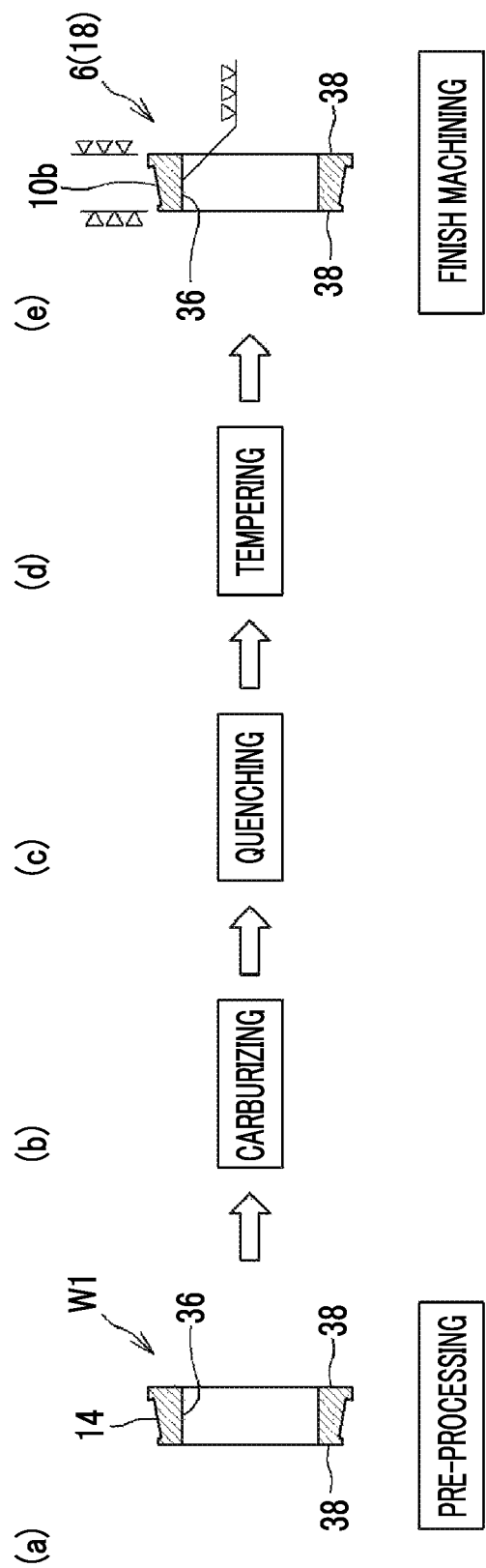
FIG. 5 is a process diagram showing a flow when an inner ring which is a component part of a tapered roller bearing is produced.

As shown in FIG. 5, in the production method of the present embodiment, a molding raw material W1 of the inner ring 6 having a rolling sliding surface 14, an inner circumferential surface 36, and an end surface 38 on which it assumed polishing removal will be performed is obtained from the above steel material (a pre-processing process shown in (a) of FIG. 5). A carburizing treatment is performed on the molding raw material W1 and thereby an intermediate material is obtained (a carburizing process shown in (b) of FIG. 5). Next, a quenching treatment is performed on the intermediate material (a quenching process shown in (c) of FIG. 5). In addition, a tempering treatment is performed on the quenched intermediate material (a tempering process shown in (d) of FIG. 5). Then, finish machining is performed on the tempered intermediate material (a finish machining process shown in (e) of FIG. 5). In the finish machining process, in the tempered intermediate material, polishing finish machining is performed on parts which form the rolling sliding surface 14, the inner circumferential surface 36, and the end surface 38, and particularly, superfinish machining is performed on the rolling sliding surface 14, and thereby the parts are finished with predetermined accuracy. Thereby, the inner ring 6 as a product is obtained. In the inner ring 6, all of the rolling sliding surface 14, the inner circumferential surface 36, and the end surface 38 are polished surfaces.

The production method includes the pre-processing process, the carburizing process, the quenching process, the tempering process and the finish machining process. In the production method, a series of processes from the carburizing process to the tempering process are also referred to as a heat treatment process. The heat treatment process will be described below in detail based on a temperature profile shown in FIG. 6.

In the carburizing process of the production method, the molding raw material W1 is set in a carburization furnace (not shown). Under an atmosphere in which a predetermined carbon potential CP is set by adjusting a flow rate of a conversion gas flowing into the furnace, the molding raw material W1 is heated at a carburization temperature C for a predetermined time. Thereby, the carburizing treatment is performed and an intermediate material is obtained. When heating at the carburization temperature C is completed, the inside of the furnace is cooled, and the temperature is set to a quenching temperature H. The intermediate material is heated at the quenching temperature H for a predetermined time. When heating at the quenching temperature H is completed, the intermediate material is put into a cooling oil bath, and the intermediate material is cooled (quenched) by oil cooling from the quenching temperature H. Thereby, the quenching treatment is performed on the intermediate material. Then, a tempering treatment is performed on the quenched intermediate material. In the tempering treatment, the quenched intermediate material is put into a heating furnace (not shown). In the heating furnace, the intermediate material is heated at a tempering temperature T for a predetermined time. After heating, the intermediate material is cooled by air, and the tempering treatment is completed. Here, in the temperature profile of the heat treatment shown in FIG. 6, a heating time at the carburization temperature C is referred to as a "carburization time Tc" and is represented as a time during which the carburization temperature C is maintained from when the temperature of the molding raw material W1 reaches the carburization temperature C. A heating time at the quenching temperature H is referred to as a "holding time Th" and is represented as a time during which the quenching temperature H is maintained from when the temperature of the intermediate material reaches the quenching temperature H. In addition, a heating time at the tempering temperature T is referred to as a "soaking time Tt" and is represented as a time during which the tempering temperature T is maintained from when the temperature of the quenched intermediate material reaches the tempering temperature T. Here, in the production method, in the quenching treatment, the temperature of the oil bath for oil cooling is set in a range of 70° C. to 90° C.

In the production method, as described above, the carbon potential CP in the carburizing process is adjusted to be in a range of 0.9 to 1.4. In the production method, in order to obtain the hardness required for a carburizing part by introducing a sufficient amount of carbon into the surface of the molding raw material and secure a retained austenite content necessary for improving crack resistance, the carbon potential CP is 0.9 or more, and preferably 1.0 or more. In order to reduce generation of an excess retained austenite content on the surface of the rolling sliding member 18 and development of a grain boundary oxide layer, the carbon potential CP is 1.4 or less, preferably 1.3 or less, and more preferably 1.2 or less.

In the production method, as described above, the carburization temperature C in the carburizing process is set in a range of 900° C. to 980° C. In the production method, in order to prevent a carburization time from increasing by securing a sufficient diffusion rate of carbon and to reduce development of a grain boundary oxide layer, the carburization temperature C is 900° C. or higher, and preferably 910° C. or higher. In order to prevent coarsening of crystal grains and reduce a reduction in the grain boundary strength, the carburization temperature C is 980° C. or lower, and preferably 970° C. or lower.

In the production method, as described above, the quenching temperature H in the quenching process is set in a range of 820° C. to 900° C. In the production method, a sufficient amount of carbon is solid-solutionized and precipitation of coarse carbides is reduced. In addition, in order to secure a predetermined retained austenite content, the quenching temperature H is 820° C. or higher, and preferably 830° C. or higher. In order for a vanadium carbide necessary for improving the hardness according to precipitation reinforcement to be precipitated and at the same time, in order to reduce generation of excess retained austenite on the surface, the quenching temperature H is 900° C. or lower, and preferably 890° C. or lower.

As can be clearly understood from the above description, in the method of producing the rolling sliding member 18 of the present disclosure, heating is performed under an atmosphere in which the carbon potential CP is adjusted for a molding raw material containing a steel material having a relatively high carbon content for a base, and quenching and tempering are performed on an intermediate material obtained by the heating. Therefore, according to the production method of the present embodiment, it is possible to obtain the desired surface layer 34 within a shorter treatment time than in a production method in the related art. In other words, it is possible to shorten a time required for formation of the surface layer 34. In the production method, it is possible to reduce the production costs. In addition, since shortening of the treatment time suppresses formation of the grain boundary oxide layer, it is possible to obtain the rolling sliding member 18 having excellent crack resistance according to the production method. According to the rolling sliding member 18 obtained in the production method, since the grain boundary oxide layer is unlikely to fall off, formation of foreign substances that could be caught between the rolling sliding member and a counterpart member is suppressed. The rolling sliding member 18 can also contribute to improvement of the product lifespan.

In the production method, since more carbon diffuses in the steel material as the carburization time Tc in the carburizing process is prolonged, the carburization time Tc can be set to be longer as necessary. Since a steel material having a relatively high carbon content is used as a base, it is possible to appropriately secure the product lifespan and shorten the carburization time, and it is possible to reduce the production costs.

In the production method, the holding time Th in the quenching process is determined such that the entire product reaches a predetermined quenching temperature. When the size of the product is larger, the holding time Th can be set to be longer.

In the production method, the tempering temperature T and the soaking time Tt in the tempering process are appropriately set in consideration of a balance between the hardness and toughness of the rolling sliding member 18, and the production costs. Specifically, the tempering temperature T is preferably set in a range of 150° C. to 200° C. The soaking time Tt is preferably set in a range of 1 hour to 5 hours.

As described above, in the rolling sliding member 18, a carbonitrided layer can be formed as the surface layer 34. When a carbonitrided layer is formed as the surface layer 34, the above carburizing process is replaced with a carbonitriding process. In the carbonitriding process, the molding raw material W1 is set in a carburization furnace. The carbon potential CP and a ratio of an ammonia gas flow rate to a conversion gas flow rate is adjusted, and under this atmosphere, the molding raw material W1 is heated at a carbonitriding temperature for a predetermined time. Thereby, an intermediate material subjected to the carbonitriding treatment is obtained. Here, in the carbonitriding process, a ratio of an ammonia gas flow rate to a conversion gas flow rate is set in a range of 1% to 10%. The carbon potential CP is set in a range of 1.0 to 1.5. The carbonitriding temperature is set in a range of 820° C. to 980° C. The carbonitriding time can be set to be longer as necessary.

In the production method of the present embodiment, the heat treatment process may include a secondary quenching process. In other words, the above quenching process may include a primary quenching process and a secondary quenching process. A heat treatment process including a secondary quenching process will be described below based on a temperature profile shown in FIG. 7.

In this heat treatment process, similarly to the above heat treatment process, a carburizing treatment is performed on a molding raw material and thereby an intermediate material is obtained. A primary quenching treatment is performed on the intermediate material. In the primary quenching treatment, the temperature is set to a primary quenching temperature H1 corresponding to the quenching temperature H in the above heat treatment process from the carburization temperature C by cooling. In this heat treatment process, when the temperature reaches the primary quenching temperature H1, and at the same time, the intermediate material is put into an oil bath, and the intermediate material is cooled (quenched) by oil cooling from the primary quenching temperature H1. Thus, in this heat treatment process, the holding time Th in the above heat treatment process is not set. In this heat treatment process, a secondary quenching treatment is performed on the intermediate material after the primary quenching. In the secondary quenching treatment, the intermediate material after the primary quenching is put into a heating furnace. In the heating furnace, the intermediate material after the primary quenching is heated at a secondary quenching temperature H2 for a predetermined time. After the heating, the intermediate material is put into an oil bath, and the intermediate material is cooled (quenched) by oil cooling from the secondary quenching temperature H2. Then, similarly to the above heat treatment process, a tempering treatment is performed on the intermediate material after the secondary quenching. Thereby, the heat treatment process is completed.

In this heat treatment process, the primary quenching temperature H1, the secondary quenching temperature H2, and a holding time Th2 at the secondary quenching temperature H2 are appropriately set in consideration of a balance between the hardness and toughness of the rolling sliding member 18 and the production costs. Specifically, the primary quenching temperature H1 is preferably set in a range of 820° C. to 900° C. The secondary quenching temperature H2 is set in a range of 820° C. to 900° C. The holding time Th2 at the secondary quenching temperature H2 is determined such that the entire product reaches a predetermined quenching temperature. When the size of the product is larger, the holding time Th2 can be set to be longer.

In the production method including the secondary quenching process, similarly to the above production method, the rolling sliding member 18 having the desired surface layer 34 is obtained within a short treatment time. Although the secondary quenching process has been added, it is possible to reduce the production costs also in this production method. In addition, since shortening of the treatment time suppresses formation of the grain boundary oxide layer, the product lifespan is improved also in the rolling sliding member 18 obtained in this production method.

EXAMPLES

The present disclosure will be described below in further detail with reference to examples. The present disclosure is not limited to these examples.

Preparation of Molding Raw Material

Four types of steel material (a steel material A, a steel material B, a steel material C and a steel material D) shown in the following Table 2 were prepared, and molding raw materials of inner rings for a tapered roller bearing (bearing model number: TRA0607) were produced. In the steel materials B to D, a content of carbon contained in the steel material was lower than 0.30 mass %. On the other hand, in the steel material A, a content of carbon contained in the steel material was higher than 0.30 mass %. In the composition of the steel material C, no vanadium was included. In the composition of the steel material D, molybdenum and vanadium were not included. In Table 2, C indicates carbon, Si indicates silicon, Mn indicates manganese, P indicates phosphorus, S indicates sulfur, Cu indicates copper, Ni indicates nickel, Cr indicates chromium, Mo indicates molybdenum, V indicates vanadium, and Al indicates aluminum.

TABLE 2

| | Representative components (mass %) | | | | | | | | | |
|---|---|---|---|---|---|---|---|---|---|---|
| | C | Si | Mn | P | S | Cu | Ni | Cr | Mo | V | Al |
| Steel material A | 0.40 | 0.30 | 0.61 | 0.008 | 0.003 | 0.01 | 0.02 | 1.18 | 0.25 | 0.29 | 0.030 |
| Steel material B | 0.20 | 0.29 | 0.61 | 0.008 | 0.003 | 0.01 | 0.02 | 1.19 | 0.25 | 0.30 | 0.030 |
| Steel material C | 0.20 | 0.20 | 0.51 | 0.012 | 0.012 | 0.08 | 1.67 | 0.56 | 0.18 | — | 0.020 |
| Steel material D | 0.21 | 0.23 | 0.73 | 0.018 | 0.002 | 0.11 | 0.05 | 0.73 | — | — | 0.020 |

Production of Inner Ring

A heat treatment shown in the following Table 3 was performed, finish machining was then performed, and inner rings (test pieces) of Examples 1 to 5 and Comparative Examples 1 to 5 were obtained.

temperature H was set to 870° C., and the holding time Th at the quenching temperature H was set to 0.5 hours. In the tempering process, the tempering temperature T was set to 180° C., and the soaking time Tt was set to 2 hours. In Example 1, no secondary quenching was performed.

Examples 2 to 5 and Comparative Examples 1 and 2

Inner rings of Examples 2 to 5 and Comparative Examples 1 and 2 were obtained in the same manner as in Example 1 except that the carbon potential CP was set as in the above Table 3.

Comparative Example 3

Figure 7:
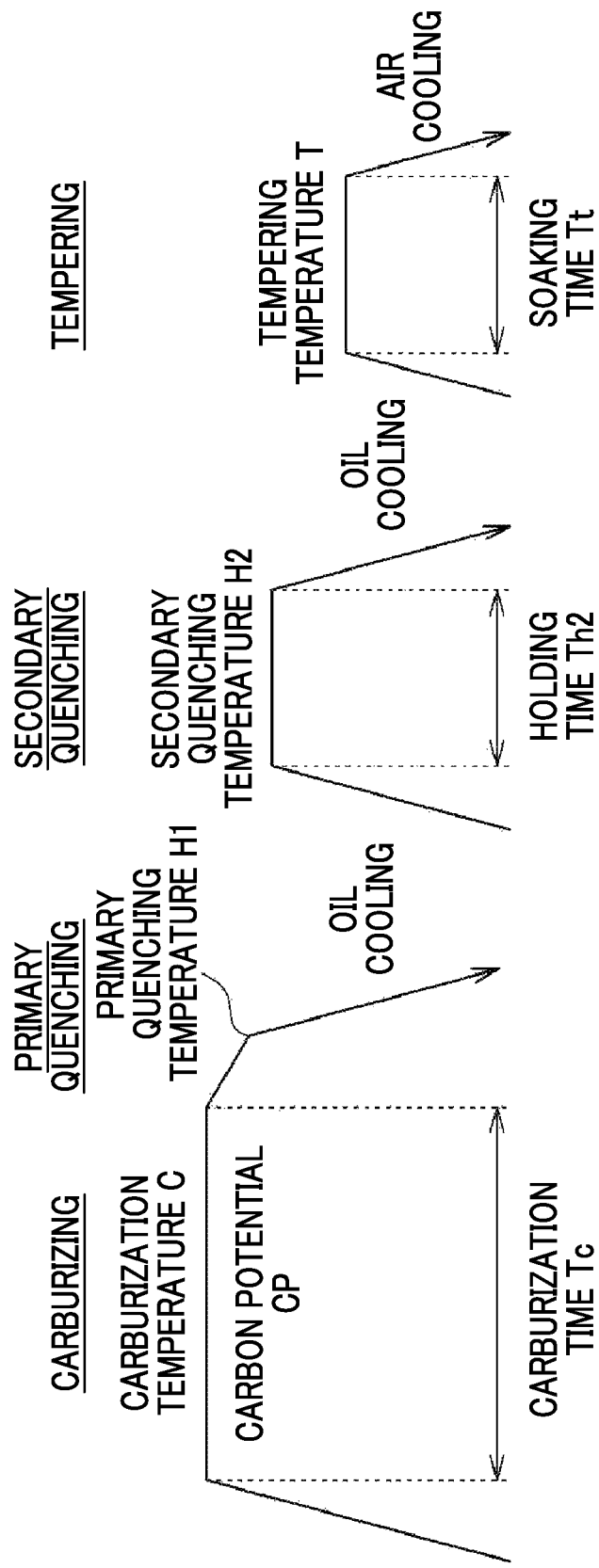
FIG. 7 is a line diagram showing another example of heat treatment conditions.

In Comparative Example 3, carburizing, primary quenching, secondary quenching, and tempering were performed on a molding raw material containing the steel material B according to the temperature profile shown in FIG. 7. As

TABLE 3

| | | Carburizing | | | Holding before quenching | | Secondary quenching | | Tempering | |
|---|---|---|---|---|---|---|---|---|---|---|
| | Steel material | Carburization time Tc (h) | Carburization temperature C (° C.) | Carbon Potential CP | Holding time Th (h) | Holding temperature H (° C.) | Holding time Th2 (h) | Holding temperature H2 (° C.) | Soaking time Tt (h) | Holding temperature T (° C.) |
| Example 1 | Steel material A | 10 | 930 | 0.9 | 0.5 | 870 | — | — | 2 | 180 |
| Example 2 | Steel material A | 10 | 930 | 1 | 0.5 | 870 | — | — | 2 | 180 |
| Example 3 | Steel material A | 10 | 930 | 1.15 | 0.5 | 870 | — | — | 2 | 180 |
| Example 4 | Steel material A | 10 | 930 | 1.3 | 0.5 | 870 | — | — | 2 | 180 |
| Example 5 | Steel material A | 10 | 930 | 1.4 | 0.5 | 870 | — | — | 2 | 180 |
| Comparative Example 1 | Steel material A | 10 | 930 | 1.5 | 0.5 | 870 | — | — | 2 | 180 |
| Comparative Example 2 | Steel material A | 10 | 930 | 0.8 | 0.5 | 870 | — | — | 2 | 180 |
| Comparative Example 3 | Steel material B | 15.5 | 930 | 1.3 | 0 | 870 | 1 | 870 | 2 | 180 |
| Comparative Example 4 | Steel material C | 15.5 | 960 | 1.45 | 0 | 880 | 1 | 810 | 2 | 180 |
| Comparative Example 5 | Steel material D | 15.5 | 960 | 1.45 | 0 | 880 | 1 | 850 | 2 | 180 |

Example 1

Figure 6:
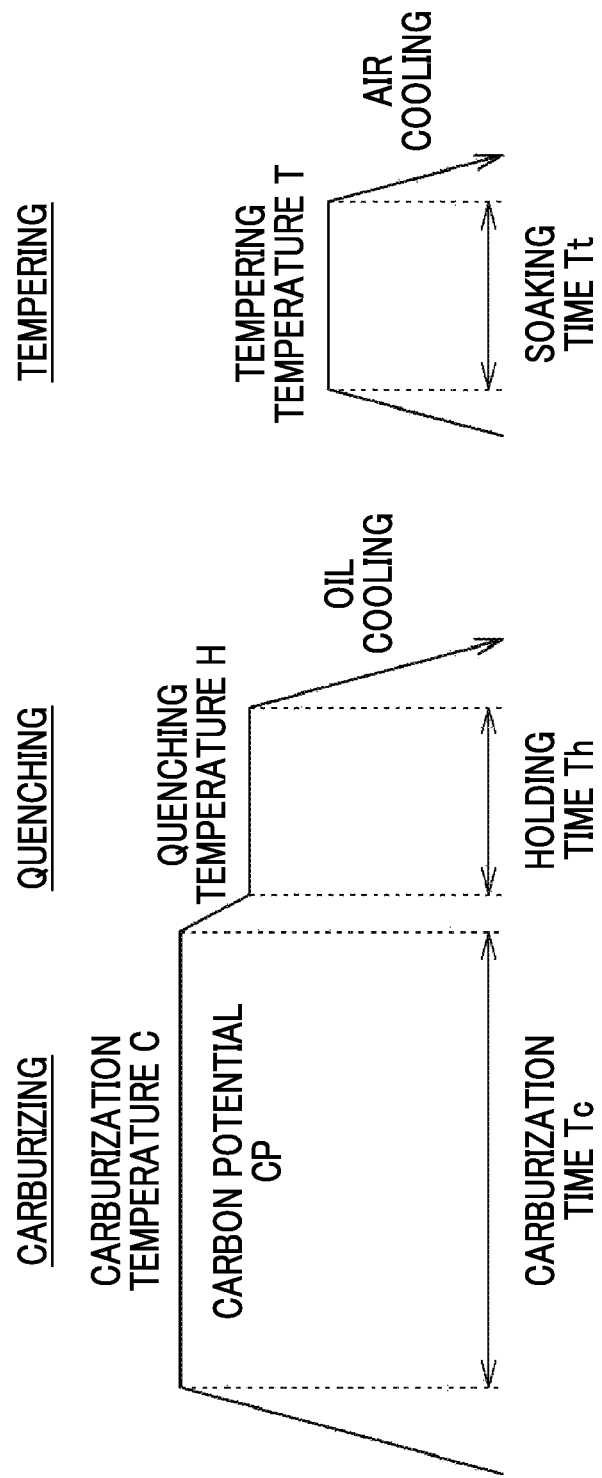
FIG. 6 is a line diagram showing an example of heat treatment conditions.

In Example 1, carburizing, quenching and tempering were performed on a molding raw material containing the steel material A according to the temperature profile shown in FIG. 6. As shown in Table 3, in the carburizing process, the carburization temperature C was set to 930° C., the carburization time Tc was set to 10 hours, and the carbon potential CP was set to 0.9. In the quenching process, the quenching shown in Table 3, in the carburizing process, the carburization temperature C was set to 930° C., the carburization time Tc was set to 15.5 hours, and the carbon potential CP was set to 1.3. In the primary quenching process, the primary quenching temperature H1 was set to 870° C. In the secondary quenching process, the secondary quenching temperature H2 was set to 870° C., and the holding time Th2 at the secondary quenching temperature H2 was set to 1 hour.

In the tempering process, the tempering temperature T was set to 180° C., and the soaking time Tt was set to 2 hours.

Comparative Example 4

In Comparative Example 4, carburizing, primary quenching, secondary quenching and tempering were performed on a molding raw material containing the steel material C according to the temperature profile shown in FIG. 7. As shown in Table 3, in the carburizing process, the carburization temperature C was set to 960° C., the carburization time Tc was set to 15.5 hours, and the carbon potential CP was set to 1.45. In the primary quenching process, the primary quenching temperature H1 was set to 880° C. In the secondary quenching process, the secondary quenching temperature H2 was set to 810° C., and the holding time Th2 at the secondary quenching temperature H2 was set to 1 hour. In the tempering process, the tempering temperature T was set to 180° C., and the soaking time Tt was set to 2 hours.

Comparative Example 5

In Comparative Example 5, carburizing, primary quenching, secondary quenching and tempering were performed on a molding raw material containing the steel material D according to the temperature profile shown in FIG. 7. As shown in Table 3, in the carburizing process, the carburization temperature C was set to 960° C., the carburization time Tc was set to 15.5 hours, and the carbon potential CP was set to 1.45. In the primary quenching process, the primary quenching temperature H1 was set to 880° C. In the secondary quenching process, the secondary quenching temperature H2 was set to 850° C., and the holding time Th2 at the secondary quenching temperature H2 was set to 1 hour. In the tempering process, the tempering temperature T was set to 180° C., and the soaking time Tt was set to 2 hours.

Evaluation of Test Pieces

Equivalent Diameter

Equivalent diameters of the test pieces were set. When the equivalent diameter was set, since an inner ring for a tapered roller bearing (bearing model number: TRA0607) was used for the test piece, the inner diameter X was 30.00 mm, the wall thickness Y was 6.63 mm, and the width Z was 19.00 mm, and a shape coefficient (1.48) of a ring was obtained based on the above Table 1. Since the product of the shape coefficient of the ring and the wall thickness Y was 9.8, when the test piece was evaluated, the equivalent diameter was set to 10 mm, and an upper limit reference of the thickness of the grain boundary oxide layer was set to 14 μm based on the above Formula (I).

Vickers Hardness and Retained Austenite Content

The Vickers hardness and the retained austenite content of the test pieces of Examples 1 to 5 and Comparative Examples 1 to 5 were measured. The results are shown in the following Table 4.

Thickness of Grain Boundary Oxide Layer

Figure 9:
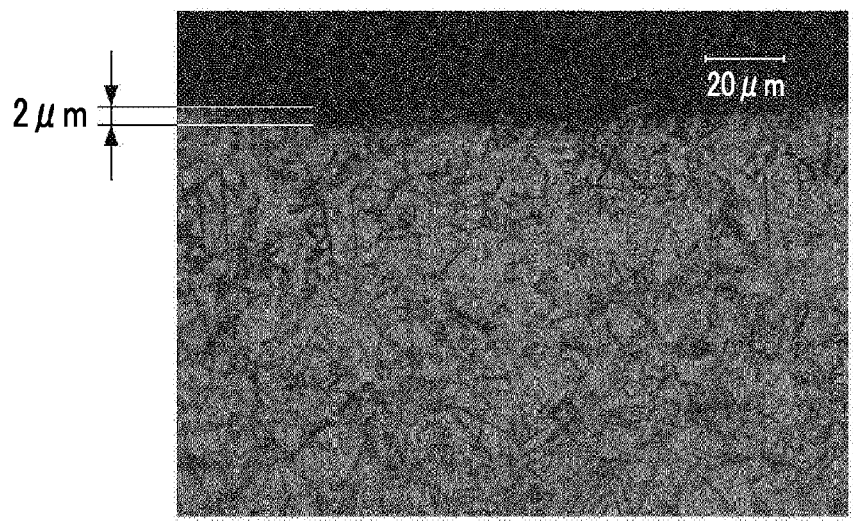
FIG. 9 is a metallurgical microscopic photograph showing a state of a surface part in a rolling sliding member of Example 3.
Figure 10:
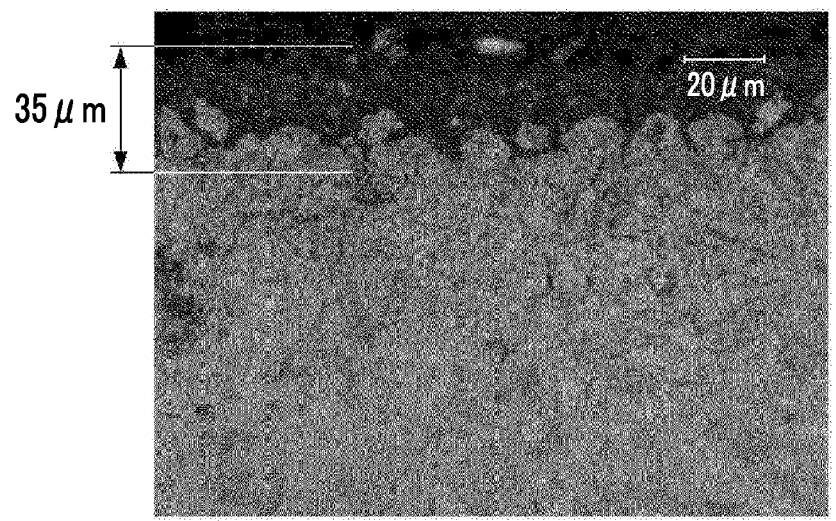
FIG. 10 is a metallurgical microscopic photograph showing a state of a surface part in a rolling sliding member of Comparative Example 3.

Cut surfaces were obtained by cutting the test pieces of Examples 1 to 5 and Comparative Examples 1 to 5 in a depth direction from a rolling sliding surface, and a nital treatment were performed on the cut surfaces. The cut surfaces were observed under a metallurgical microscope, and a length from the rolling sliding surface to the deepest position, that is, a length from the surface to the bottom of the grain boundary oxide layer, was measured. The measured values are shown as the thickness of the grain boundary oxide layer in the following Table 4. Here, as observation examples of the grain boundary oxide layer, an observation photograph of Example 3 is shown in FIG. 9 and an observation photograph of Comparative Example 3 is shown in FIG. 10.

Inner Ring Large Flange Collapse Load

Figure 8:
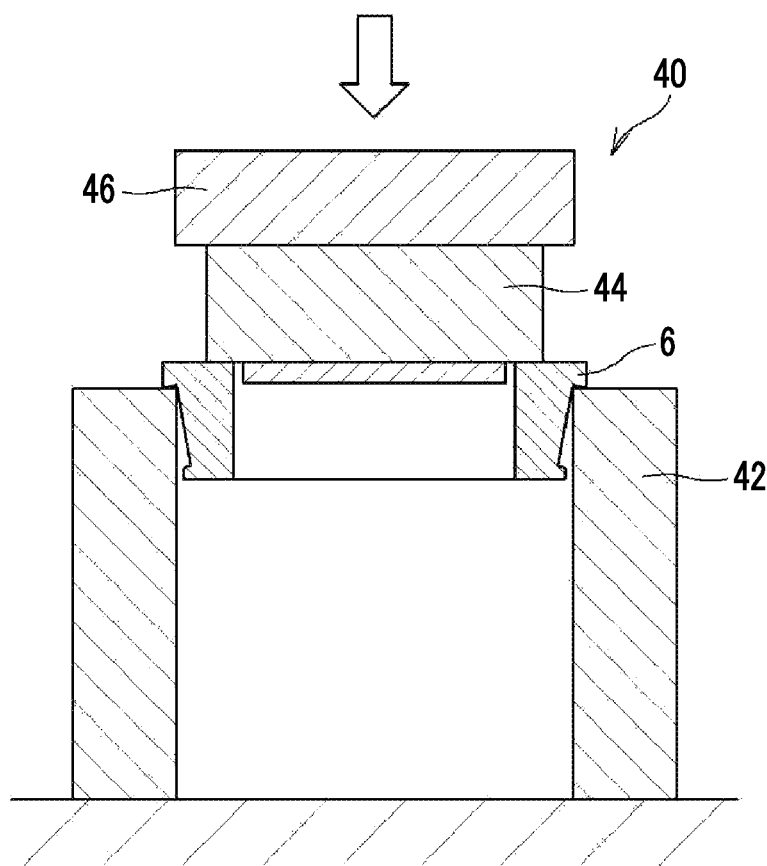
FIG. 8 is a schematic diagram showing a test machine used for a collapse test of a rolling sliding member.

A measurement tool 40 shown in FIG. 8 was set in an Amsler type compression test machine (250 kN) and inner ring large flange collapse loads of the test pieces of Examples 1 to 5 and Comparative Examples 1 to 5 were measured. The results are shown in the following Table 4. Here, the measurement tool 40 includes a support ring 42 and a pressing piston 44. When the collapse load was measured, as shown in FIG. 8, the inner ring 6 as a test piece was interposed between the pressing piston 44 and the support ring 42, a pressing piston was pressed by a crosshead 46 of the compression test machine, and thus a load was applied to the inner ring 6. Here, a load speed was set to 100 kgf/sec in this measurement.

TABLE 4

|  | Vickers hardness (HV) | Retained austenite content (%) | Thickness of grain boundary oxide layer (μm) | Inner ring large flange collapse load (kN) |
| --- | --- | --- | --- | --- |
| Example 1 | 744.1 | 26 | 2 | 128 |
| Example 2 | 775.3 | 29 | 3 | 119 |
| Example 3 | 756.3 | 30 | 2 | 115 |
| Example 4 | 742.5 | 30 | 7 | 108 |
| Example 5 | 727.3 | 35 | 12 | 106 |
| Comparative Example 1 | 722.1 | 45 | 16 | 99 |
| Comparative Example 2 | 693.7 | 22 | 2 | — |
| Comparative Example 3 | 757.6 | 32 | 35 | 86 |
| Comparative Example 4 | 738.7 | 29 | 31 | 92 |
| Comparative Example 5 | 722.2 | 21 | 27 | 90 |

Comparative Examples 1 to 5

In Comparative Example 1 in which, as shown in Table 4, the same steel material A as in Examples 1 to 5 was used, the carbon potential CP was set to 1.5, and a heat treatment process was performed, although the Vickers hardness and the retained austenite content were the same levels as in Example 1 to 5, the thickness of the grain boundary oxide layer was larger than an upper limit reference (14 μm) of the thickness of the grain boundary oxide layer, and the inner ring large flange collapse load was lower than those in Examples 1 to 5. In Comparative Example 2 in which the steel material A was used, the carbon potential CP was set to 0.8, and a heat treatment process was performed, although the thickness of the grain boundary oxide layer was 2 μm, and formation of the grain boundary oxide layer was suppressed, the Vickers hardness and the retained austenite content were lower than those in Examples 1 to 5. In Comparative Example 2, since the inner ring large flange collapse load was assumed to be low, the collapse load was not measured. A content of carbon contained in the steel material was lower than that of the steel material A. In Comparative Examples 3 to 5 in which the steel materials B to D were used, the Vickers hardness and the retained austenite content were the same as those in Examples 1 to 5. However, in Comparative Examples 3 to 5, a relatively high carbon potential was set in order to form a surface layer, but a longer carburization time than that in Examples 1 to 5 was required. The thickness of the grain boundary oxide layer was larger than an upper limit reference (14 µm) of the thickness of the grain boundary oxide layer, and the collapse loads of Comparative Examples 3 to 5 were lower than the collapse loads of Examples 1 to 5.

Examples 1 to 5

Compared to Comparative Examples 1 to 5, in Examples 1 to 5, the Vickers hardness was 727.3 (HV) to 775.3 (HV) and retained austenite contents thereof were 26(%) to 35(%). In Examples 1 to 5, the hardness and toughness of the surface layer required for application to a rolling bearing were sufficiently secured. In addition, the thickness of the grain boundary oxide layer was 2 µm to 12 µm and was lower than the upper limit reference (14 µm) of the thickness of the grain boundary oxide layer. That is, in Examples 1 to 5, formation of the grain boundary oxide layer was suppressed. In addition, in Examples 1 to 5, it can be understood that the inner rings (rolling sliding members) having an inner ring large flange collapse loads that was relatively higher than the inner ring large flange collapse loads of Comparative Examples 1 to 5, having excellent crack resistance, and capable of contributing to improvement of the product lifespan were formed. However, it can be understood that the carburization times in Examples 1 to 5 were shorter than those in Comparative Examples 3 to 5 and Examples 1 to 5 can contribute to reducing the production costs.

As can be clearly understood from the above results, the rolling sliding members of examples had superior evaluation results compared to the sliding members of comparative examples. The superiority of the present disclosure can be clearly understood based on the evaluation results.

The rolling sliding member and the method of producing the same described above can also be applied to mechanical parts such as a gear and a shaft which have a part in which no finish machining is performed after a heat treatment.

What is claimed is:

1. A rolling sliding member including a rolling sliding surface that is in contact with a counterpart member in a relative manner, the rolling sliding member comprising:
   a base part having a composition including 0.30 mass % to 0.45 mass % of carbon, 0.15 mass % to 0.45 mass % of silicon, 0.40 mass % to 0.75 mass % of manganese, 1.10 mass % to 2.00 mass % of chromium, 0.10 mass % to 0.35 mass % of molybdenum, 0.20 mass % to 0.40 mass % of vanadium, and 0.005 mass % to 0.100 mass % of aluminum and a remainder of iron and inevitable impurities; and
   a surface layer positioned around the base part and includes the rolling sliding surface,
   wherein a Vickers hardness of the surface layer is 700 to 800,
   a retained austenite content of the surface layer is 25 volume % to 50 volume %, and
   the thickness of a grain boundary oxide layer in the surface layer is equal or larger than 2 µm and satisfies the following formula expressed using an equivalent diameter of the rolling sliding member, Formula: Thickness of grain boundary oxide layer≤equivalent diameter of rolling sliding member×1.4×10⁻³.

the rolling sliding member is one of selected from an inner ring of a cylindrical roller bearing, an outer ring of a cylindrical roller bearing, an inner ring of a tapered roller bearing and an outer ring of a tapered roller bearing; and
   when the rolling sliding member is the outer ring or the inner ring, the equivalent diameter of the rolling sliding member is represented by the product of a shape coefficient of a ring determined by an inner diameter X, a wall thickness Y and a width Z of the ring and the wall thickness Y of the ring, and "British Standards Institute: Method for the Estimation of Equivalent Diameters in the Heat Treatment of Steel" is referred to for shape coefficients of the ring.

2. The rolling sliding member according to claim 1, wherein the surface layer is either a carburized layer or a carbonitrided layer.

3. A rolling bearing comprising:
   an outer ring having a first rolling sliding surface on an inner circumference of the outer ring;
   an inner ring having a second rolling sliding surface on an outer circumference of the inner ring; and
   a plurality of rolling elements disposed between the first rolling sliding surface and the second rolling sliding surface,
   wherein at least one of the outer ring, the inner ring, and the rolling element is the rolling sliding member according to claim 1.

4. A rolling sliding member including a rolling sliding surface that is in contact with a counterpart member in a relative manner, the rolling sliding member comprising:
   a base part having a composition including
      0.30 mass % to 0.45 mass % of carbon,
      0.15 mass % to 0.45 mass % of silicon,
      0.40 mass % to 0.75 mass % of manganese,
      1.10 mass % to 2.00 mass % of chromium,
      0.10 mass % to 0.35 mass % of molybdenum,
      0.20 mass % to 0.40 mass % of vanadium, and
      0.005 mass % to 0.100 mass % of aluminum and
      a remainder of iron and inevitable impurities; and
   a surface layer positioned around the base part and includes the rolling sliding surface, wherein
   a Vickers hardness of the surface layer is 700 to 800,
   a retained austenite content of the surface layer is 25 volume % to 50 volume %, and
   the thickness of a grain boundary oxide layer in the surface layer is equal or larger than 2 µm and is equal or smaller than 14 µm,
   wherein the rolling sliding member is one of selected from an inner ring of a cylindrical roller bearing, an outer ring of a cylindrical roller bearing, a cylindrical roller and a tapered roller an inner ring of a tapered roller bearing and an outer ring of a tapered roller bearing.

5. The rolling sliding member according to claim 4, wherein
   the surface layer is either a carburized layer or a carbonitrided layer.

* * * * *